US009147129B2

United States Patent
Liu et al.

(10) Patent No.: US 9,147,129 B2
(45) Date of Patent: Sep. 29, 2015

(54) SCORE FUSION AND TRAINING DATA RECYCLING FOR VIDEO CLASSIFICATION

(71) Applicant: Honeywell International Inc., Morristown, NJ (US)

(72) Inventors: Jingchen Liu, State College, PA (US); Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 13/622,328

(22) Filed: Sep. 18, 2012

(65) Prior Publication Data

US 2013/0132311 A1 May 23, 2013

Related U.S. Application Data

(60) Provisional application No. 61/561,721, filed on Nov. 18, 2011.

(51) Int. Cl.
*G06F 15/18* (2006.01)
*G06K 9/62* (2006.01)
*G06N 99/00* (2010.01)
*G06K 9/00* (2006.01)

(52) U.S. Cl.
CPC .......... *G06K 9/6256* (2013.01); *G06K 9/00718* (2013.01); *G06K 9/6264* (2013.01); *G06K 9/6292* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2007/0136224 A1* | 6/2007 | Aboutalib | 706/52 |
| 2008/0027887 A1* | 1/2008 | Barbu et al. | 706/25 |
| 2010/0121566 A1* | 5/2010 | Joshi et al. | 701/202 |
| 2011/0081073 A1* | 4/2011 | Skipper et al. | 382/159 |
| 2011/0106734 A1* | 5/2011 | Boult et al. | 706/12 |
| 2011/0119212 A1* | 5/2011 | De Bruin et al. | 706/12 |
| 2013/0132311 A1* | 5/2013 | Liu et al. | 706/12 |

OTHER PUBLICATIONS

Wu, Y. et al. "Optimal multimodal fusion for multimedia data analysis." Proceedings of the 12th annual ACM international conference on Multimedia. ACM, 2004. doi>10.1145/1027527.1027665.*

(Continued)

*Primary Examiner* — Jeffrey A Gaffin
*Assistant Examiner* — Benjamin Buss
(74) *Attorney, Agent, or Firm* — Schwegman Lundberg & Woessner, P.A.

(57) ABSTRACT

Multiple classifiers can be applied independently to evaluate images or video. Where there are heavily imbalanced class distributions, a local expert forest model for meta-level score fusion for event detection can be used. Performance variations of classifiers in different regions of a score space can be adapted. Multiple pairs of experts based on different partitions, or "trees," can form a "forest," balancing local adaptivity and over-fitting. Among ensemble learning methods, stacking with a meta-level classifier can be used to fuse an output of multiple base-level classifiers to generate a final score. A knowledge-transfer framework can reutilize the base-training data for learning the meta-level classifier. By recycling the knowledge obtained during a base-classifier-training stage, efficient use can be made of all available information, such as can be used to achieve better fusion and better overall performance.

17 Claims, 9 Drawing Sheets

(56) References Cited

OTHER PUBLICATIONS

Liu, C-L. "Classifier combination based on confidence transformation." Pattern Recognition 38.1 (2005): 11-28. doi:10.1016/j.patcog.2004.05.013.*

Suganthi, M. et al. "An enhanced decision support system for breast tumor identification in screening mammograms using combined classifier." Proceedings of the International Conference and Workshop on Emerging Trends in Technology. ACM, 2010. DOI:10.1145/1741906.1742088.*

Singh, R. et al. "Intelligent biometric information fusion using support vector machine." Soft Computing in Image Processing. Springer Berlin Heidelberg, 2007. 325-349.*

Mansoorizadeh, M. et al. "Multimodal information fusion application to human emotion recognition from face and speech." Multimedia Tools and Applications 49.2 (2010): 277-297. Online Aug. 20, 2009. DOI 10.1007/s11042-009-0344-2.*

Rahman, M.M. et al. et al. "Medical image retrieval with probabilistic multi-class support vector machine classifiers and adaptive similarity fusion." Computerized Medical Imaging and Graphics 32.2 (2008): 95-108. doi:10.1016/j.compmedimag.2007.10.001.*

Brax, C. et al. "An ensemble approach for increased anomaly detection performance in video surveillance data." Information Fusion, 2009. FUSION'09. 12th International Conference on. IEEE, 2009.*

Jaiswal, S. "3D Face Modeling: Comprehensive Description." Journal of Global Research in Computer Science 2.6 (2011): 151-189.*

Cevikalp, H. et al. "Local classifier weighting by quadratic programming." Neural Networks, IEEE Transactions on 19.10 (2008): 1832-1838. DOI:10.1109/TNN.2008.2005301.*

Terrades, O.R. et al. "Optimal classifier fusion in a non-bayesian probabilistic framework." Pattern Analysis and Machine Intelligence, IEEE Transactions on 31.9 (2009): 1630-1644. DOI:10.1109/TPAMI.2008.224.*

\* cited by examiner

SCORE FUSION AND TRAINING DATA RECYCLING FOR VIDEO CLASSIFICATION

CLAIM OF PRIORITY

This patent application claims the benefit of priority, under 35 U.S.C. Section 119(e), to Liu, U.S. Provisional Patent Application Ser. No. 61/561,721, entitled "CLASSIFIER SCORE FUSION THROUGH A MIXTURE OF LOCAL EXPERTS," filed on Nov. 18, 2011, which is hereby incorporated by reference herein in its entirety.

STATEMENT REGARDING FEDERALLY SPONSORED RESEARCH OR DEVELOPMENT

This invention was made with government support under award number D11PC20069 awarded by the Intelligence Advanced Research Projects Activity (IARPA). The government has certain rights in this invention.

BACKGROUND

In many applications, particularly in image or video retrieval from large datasets, classifiers are commonly used to assign a score indicating the probability that a given item (image or video) belongs to a particular category. In one application, classifiers are used to retrieve video clips of a particular category, such as to automate a task otherwise performed by an intelligent analyst. Commercial classifiers can be used to detect abnormal behavior in airports or shoplifting in retail settings.

Classifiers are generally trained to assess probability given a particular feature of the input image or input video. The features are chosen by system designers to exploit a cue to the underlying category. In systems that distinguish between similar categories, more than one cue, and thus more than one type of feature may be used.

OVERVIEW

The present inventors have recognized, among other things, that a problem to be solved can include using classifiers to assign a score to indicate a probability that a given item (e.g., an image or video item) belongs to a particular category. The present subject matter can help provide a solution to this problem, such as by combining information from multiple classifiers and/or multiple feature types in order to assess a probability given multiple cues about an underlying category.

Multiple classifiers can be applied independently to evaluate each image or video and provide a "likelihood" score. Where there are heavily imbalanced class distributions, a local expert forest model for meta-level score fusion for event detection can be used. Performance variations of classifiers in different regions of a score space can be adapted using a divide-and-conquer technique. For example, a likelihood-space can be partitioned while maintaining a sensitivity to local label distributions in imbalanced data, and at least a pair of locally optimized experts can be trained each time. Multiple pairs of experts based on different partitions (herein, "trees") can form a "forest," balancing local adaptivity and over-fitting of the model. As a result, classifiers in regions of the score space where their performance is poor can be disregarded, such as to achieve local source selection and fusion.

Among ensemble learning methods, stacking with a meta-level classifier can be used to fuse an output of multiple base-level classifiers to generate a final score. Labeled data is usually split for base-training and meta-training such that the meta-level learning is not impacted by over-fitting of base level classifiers on their training data. A knowledge-transfer framework can reutilize the base-training data for learning the meta-level classifier. By recycling the knowledge obtained during the base-classifier-training stage, efficient use can be made of all available information, such as can be used to achieve better fusion and better overall performance.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
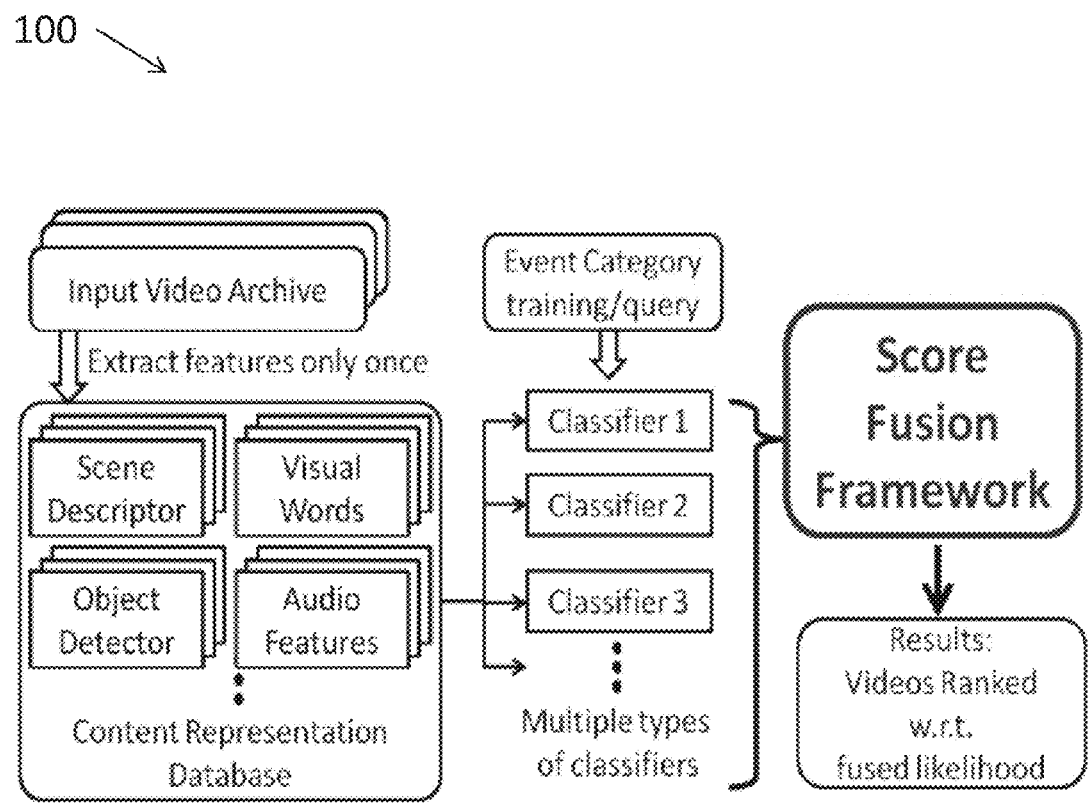
FIG. 1 illustrates generally an example of a system that can be used to extract or store several features from a video archive, such as in a database.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Classifier systems that distinguish between similar categories utilize more than one cue and hence multiple types of features. For example, in order to distinguish in a video, both "feeding an animal" and "grooming an animal", one feature is used to detect animal, and another feature is used to distinguish between feeding and grooming. In various embodiments, information from multiple classifiers (and thus multiple feature types) is combined in order to assess a probability given multiple cues.

Content-based exploitation and retrieval of digital video from large datasets is an important topic in computer vision, with a wide range of potential applications. Recently, with the rapid growth of multimedia data shared on platforms such as YouTube, some researchers have switched their focus from recognizing simple events, such as recognizing a single person waving, such as from a high-quality video (e.g., from a static camera with a clean background) to more complicated events that contain multiple object-interactions, such as recognizing boxing from less controlled videos (e.g., from a hand-held camera with cluttered background).

Complex events can be detected in video clips in a large multimedia archive (e.g., the 1000+ hour collection of about 34 k clips from the Multimedia Event Detection task of TRECVID2011), such as in videos that are uncontrolled with respect to camera motion, background clutter, and human editing. Several challenges that can come with video event detection are, among others, (1) intra-class and inter-class variation; (2) high-dimensional features; and (3) imbalanced labeled data.

For example, event categories can exhibit intra-class variation (e.g., variation in the presentation of a common theme, such as different presentation of the same or different wedding cakes), broad inter-class variation (e.g., variation in the theme itself, such as presentation of wedding cakes vs. presentation of reptiles), or rich temporal structure (e.g. changing a vehicle tire or making a sandwich), such as may not be easily estimated from a single frame. Moreover, given the variety of real-world videos, any particular event class (e.g. wedding ceremonies), only comprises a small portion in the entire video database, which can result in an imbalanced labeled data for training one-versus-all classifiers to detect each particular event. Local expert forest for score fusion can resolve the dilemma between local adaptivity and over fitting from imbalanced training data.

A content-based image or video retrieval system can use score fusion to aid in browsing multimedia archives. Score fusion can be used for feature-based browsing, activity-based browsing (i.e., finding video clips that show the same event type), or the score fusion approach can be used for other modalities such as object-based browsing. Useful systems can incorporate a range of visual features, audio features, or classification methods associated with the features.

Fusion of multiple cues can be done in a number of ways. For example, in feature-level fusion, multiple features can be combined the resulting fused feature can be classified with a classifier trained on such data. While this is useful in certain cases, it imposes limitations on the classifier's configuration, and may take a long time to train since training complexity is proportional to the feature size. Score level fusion solves the cue combination problem by analyzing outputs of multiple classifiers, each of which can be trained (and subsequently evaluated) on the raw features. Decision level fusion involves taking binary decisions from multiple classifiers and combining them, such as with a voting or weighting procedure.

In various embodiments, a method of score fusion is used. One of the challenges of score fusion is handling classifiers whose outputs are biased in different directions. For example, classifier A may tend to assign high probabilities while classifier B may assign low probabilities. The score fusion method can take these biases into account and, in systems with many classifiers, identify those that have highly correlated errors in order not to bias the system towards such errors.

In an example, score fusion can use local experts. Local experts can use a "divide-and-conquer" approach, instead of learning one global fusion framework, to automatically learn different fusion strategies that better adapt to local statistics of classifier outputs. In an example, score fusion can use an expert forest configuration. An expert forest can use multiple, random partitions of an input space (e.g., as a tree structure), which can be considered to form a "forest." In this example, the output of multiple local experts can be further fused to generate a final output.

In an example, training data can be re-used for meta-level classifier optimization. For example, in stacked classifier learning, training data for base-level classifiers is not supposed to be used again for the meta-level classifier because the data can generate a biased score output. However, in cases where training data is limited, dividing available training data into base-training and meta-training may degrade the performance of both due to insufficient training data. In an example, a method can use a normalized base-level score output from training data in meta-level learning without bias, thus achieve recycling (more efficient use) of the training data.

The local fusion expert model can be applied to any score-fusion based classification problem. In a training mode, score outputs from base-level classifiers of each labeled data instance (e.g., video clip or image) as well as data labels (e.g., an association with a particular category) can be the only system input. In this case, the present system could automatically create a fusion expert forest.

FIG. 1 illustrates generally an example of a system 100 that can be used to extract or store several features from a video archive, such as in a database. A bank of base classifiers follow, each of which can be trained to produce a likelihood score based on a subset of the features. The classifier outputs for a particular event can be fused, and the resulting fused likelihood can be used to rank video clips, such as relative to an operator's interest. In an example, by including a wide range of video and audio features, the system can be configured to better handle semantically diverse events.

In some experiments described below, a single feature may not provide sufficient performance across all event categories, but some features may be particularly suited for particular categories. For example, acoustic features can outperform others on birthday party recognition, motion features can outperform others on flash mob gathering recognition, and object detection features can outperform others on recognizing a vehicle getting unstuck.

A database of rich features can be used to classify ad hoc event categories, such as without a need to re-process the archive clips. Having a large feature set complicates fusion, however, because not all features may be useful with respect to a particular event. Therefore, the fusion system can identify and ignore such non-discriminative features and their associated base classifiers.

Performing the fusion at the score level can abstract away some details of the underlying classifiers, and permit use of different classification methods for the features to which they are best suited. For example, score fusion can permit numerical combination of temporal models, such as on 3D features for spatio-temporal matching with kernel methods (e.g., support vector machine, or SVM) applied to bag of word-type features. In an example, a score fusion system can permit later introduction of scores from classification schemes as they are introduced. In score fusion, re-training can be indicated, such as only when a new classifier's output is provided.

Because each base classifier layer produces a scalar likelihood value from a high-dimensional audio/video feature, fusion in the score space can be faster than fusion at the feature level. This advantage in training complexity can be used to provide robustness to missing features, such as by training multiple models for base classifier combinations that may be given for any particular clip at evaluation time. While a full power set may not be necessary, TRECVID clips occasionally lack audio data, requiring separate fusion models for video-only and audio and video based classifier sets. As compared to voting methods for decision-level fusion, score-fusion can be preferred because the output is a continuous score (likelihood) for ranking the archive clips.

Figure 2:
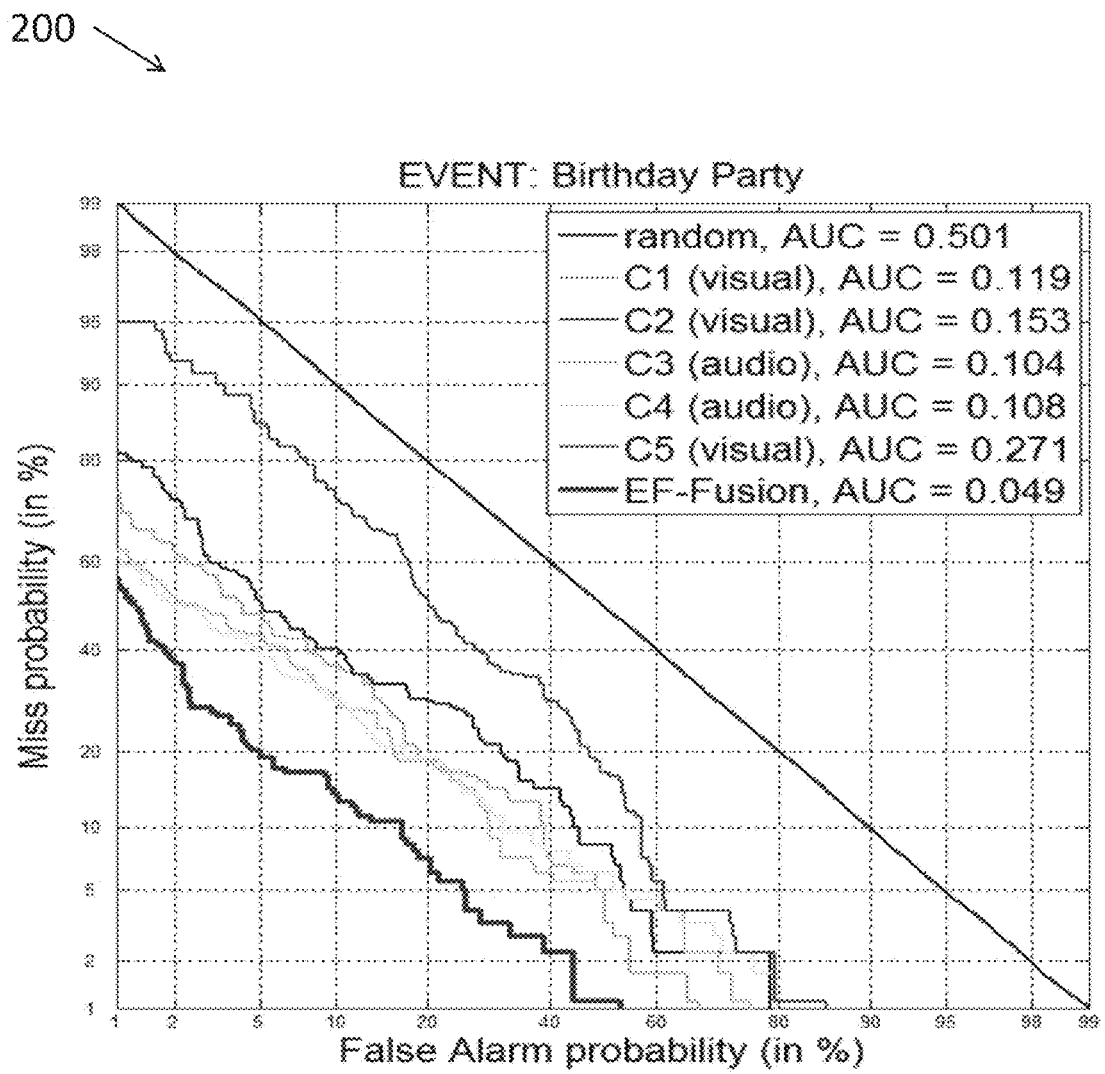
FIG. 2 illustrates generally an example plot of a fusion result.

FIG. 2 illustrates generally an example plot 200 of an actual fusion result, including detection-error-trade-off (DET) curves. The example plot 200 can be very similar to Receiver Operating Characteristic (ROC) curves, but with a nonlinear scale on each of the axes, such as to make the curves appear more "linear." The DET curves of FIG. 2 illustrate generally fusion performance (e.g., from 3 visual classifiers and 2 audio classifiers) in detecting a birthday party. In the example of FIG. 2, at 6% missed detections, there can be about a 20% false alarm probability. This is a significant improvement over the best base classifier, which has 20% miss at the same false alarm level, as shown.

Discriminative score fusion differs from classification or regression problems because it can use a continuous and semantically meaningful input (e.g., likelihood scores) with discrete labels to produce continuous output (e.g., a fused likelihood score) for ranking. Score fusion can be similar to ensemble stacking, such as where separate training data are used for base classifier- and meta-level (fusion) training.

Figure 3A:
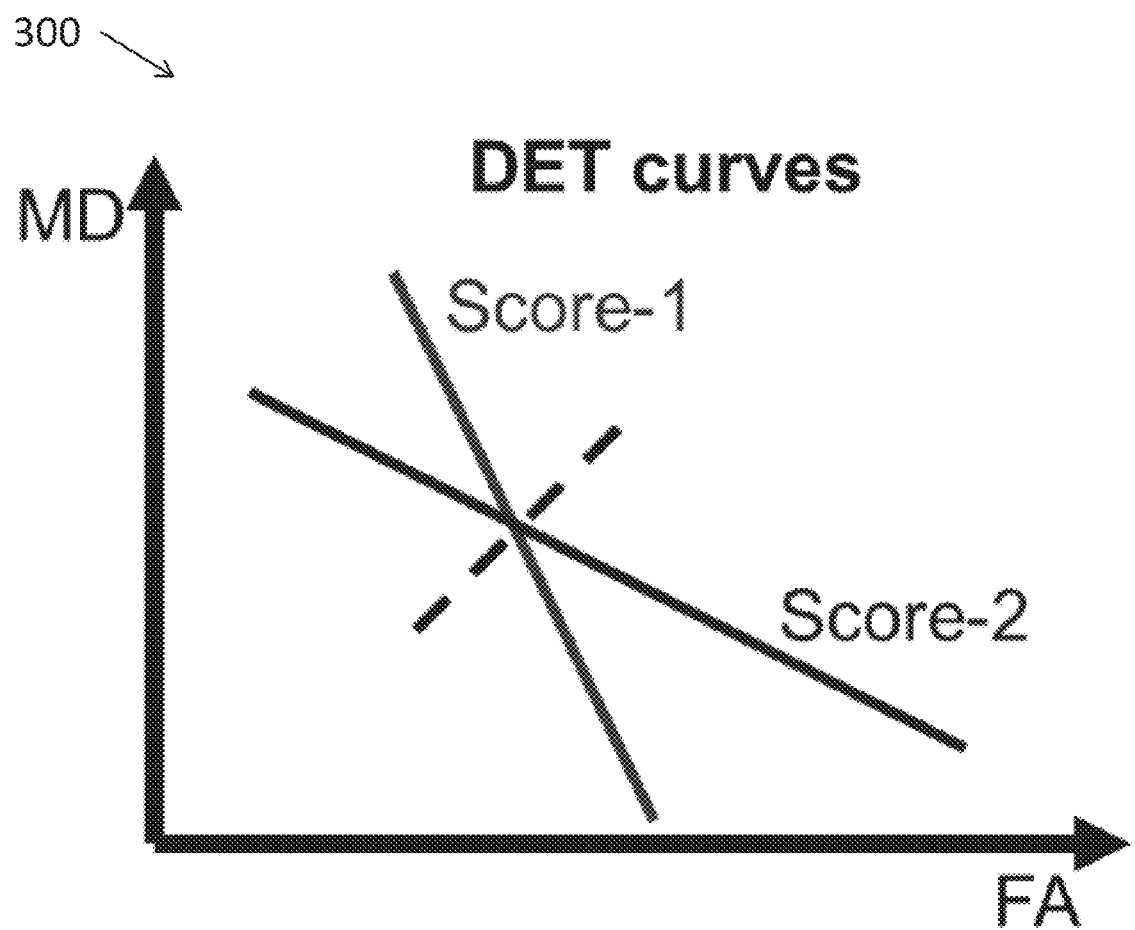
FIG. 3A illustrates generally a plot of the performance of two base classifiers plotted as DIET curves.

In linear fusion, there can be limited degrees of freedom because each base-classifier can be assigned a fixed weighting. FIG. 3A illustrates generally a plot 300 of the performance of two base classifiers plotted as DET curves. In the example of FIG. 3A, classifier C2 has relatively better performance at the upper-left region (e.g., corresponding to data with a high likelihood score), and classifier C1 outperforms C2 at the bottom-right region (e.g., corresponding to data with a low likelihood score).

However, base-classifiers can be weighted differently, such as in regions of an M-dimensional score space defined by the outputs of M base classifiers. A mixture of local expert model (MoE) can be a solution since it provides local flexibility, and because non-negative linear fusion can still be performed within each local region to provide good generalization.

An Expert Forest model can be provided, such as using a one-layer binary partition with two local experts. A score space can be divided in two, such as with a sensitivity to label distributions in each cluster so that the experts have enough data to avoid over-fitting, while still being able to adapt to local data properties. Linear fusion can be applied with non-negative weight constraints on local clusters, such as to provide each local model with strong generalization while allowing for base classifier selection. Multiple local experts that have overlapping regions can jointly contribute to the weight set used such that an overall model gains a much higher degree of freedom to adapt to local properties while maintaining good generalization ability.

Figure 3B:
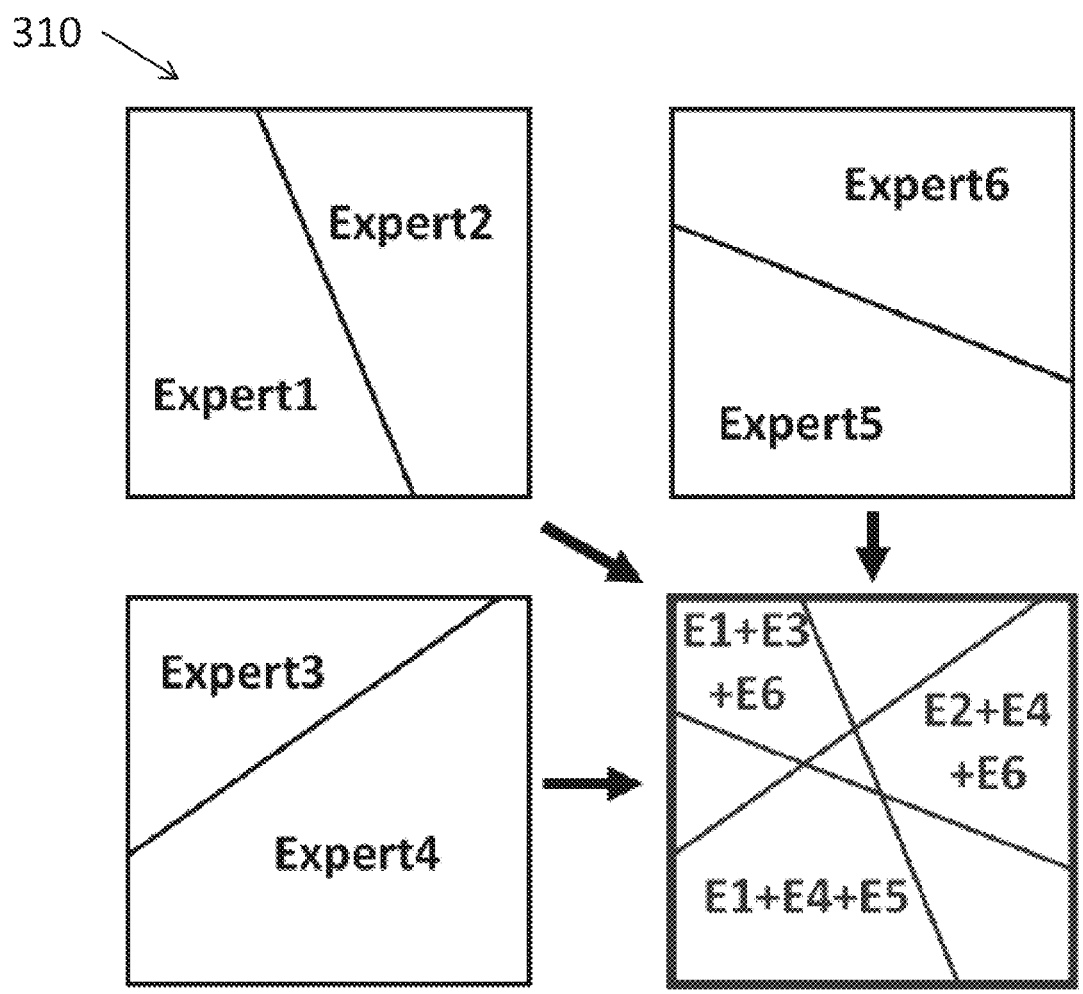
FIG. 3B illustrates generally an example that includes multiple partitions and expert pairs within a score space.

FIG. 3B illustrates generally an example 310 that includes multiple partitions and expert pairs within a score space. The multiple expert pairs can be combined to form an expert forest (see, e.g., the lower-right quadrant of FIG. 3B) to account for local performance variations.

Figure 4:
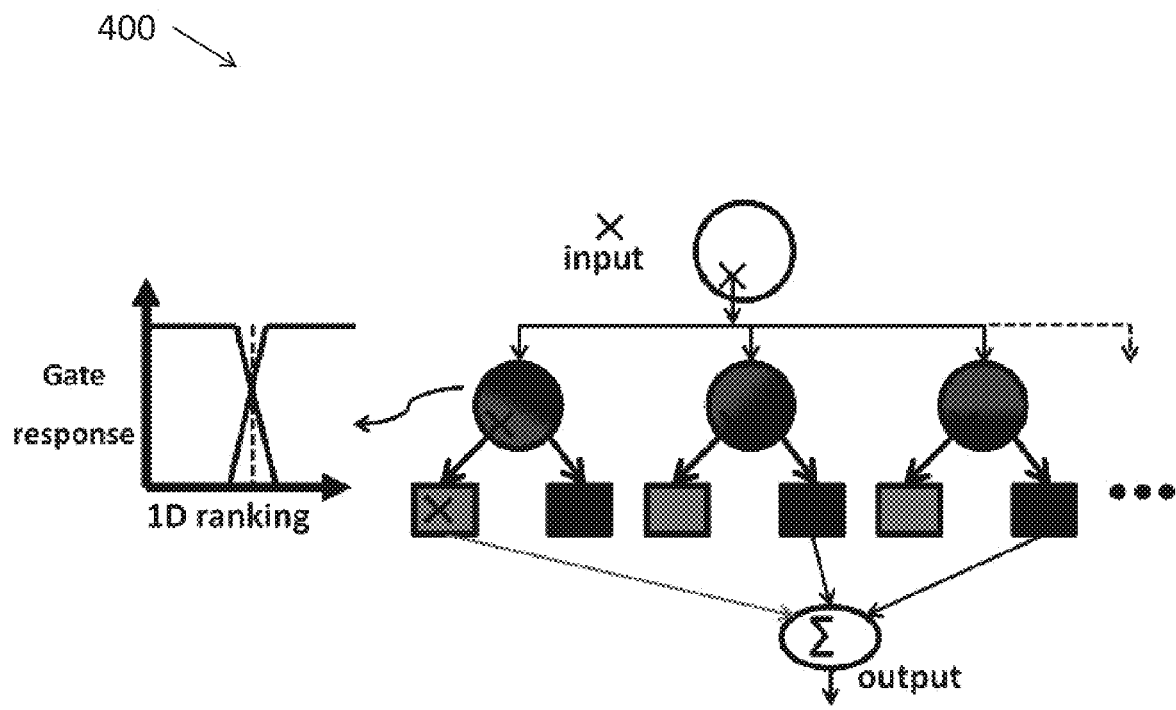
FIG. 4 illustrates generally an example of a local expert fusion model framework.

FIG. 4 illustrates generally an example of a local expert fusion model framework 400. The framework 400 can include multiple, 1-layer binary partition trees. In the example of FIG. 4, an input vector comprising M base classifier scores can be fused to a single scalar output. The input's position, X, in the score space (illustrated generally by the large white circle) can determine, such as for each tree, which set of fusion weights is applied. The fused weights from each of the trees can be combined to general a final fused output.

In the example of FIG. 4, each of the multiple 1-layer binary partition trees divides the score space in two, and then handles the score spaces independently. In an example, at test time, input score vectors can first pass through multiple "gates" to determine which weight sets are applied to data in the particular part of the score space. The weighted scores from each of the trees can be combined (e.g., averaged, or otherwise operated on) in order to generate a final fused output.

Figure 5A:
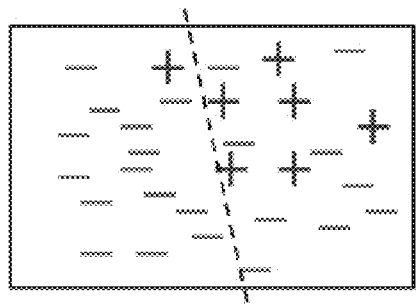
FIGS. 5A-5D illustrate generally partitioning a score space in the presence of imbalanced class labels.

Under the MoE model, when class labels are not balanced, space partitioning may locally exacerbate the imbalance. This is illustrated in the example of FIG. 5A, which shows that in a blind K-means partition, ignoring the labels produces one cluster containing mostly negatively-labeled data.

Unlike linear discriminant analysis (LDA) or decision trees, which look for a separation between positive and negative labels, the present training prefers a balanced distribution of labels in order to prevent local over-fitting. To address this, K-means can be applied separately to the positive (+) and negative (−) samples, such as to partition both types of labels into two clusters (e.g., C1, C2), and merge them in a later stage (see, e.g., FIG. 5B). Given different random initializations of K-means, various partitions on both the (+) and (−) samples can be obtained. In an example, to get random partition of clusters with more diversity, K-means can be performed in a random subspace without requiring full convergence. In an example, if a (+) cluster and a (−) cluster spatially overlap completely, they can be merged to form a local space that is rich with both (+) and (−) labels. In order to evaluate the consistency of merging a binary partition on (+) labels with a partition on (−) labels, the idea of mutual information can be used to indicate a spatial overlap of (+) and (−) clusters to be merged.

For example, let a binary random variable '+' $\in \{c_1 + c_2\}$ indicate a sample data can belong to one of the (+) clusters, with a probability $p(+=c_{1+})+p(+=c_{2+})=1$. Similarly, the same sample can also belong to either of the negative clusters with $p(-=c_{1-})+p(-=c_{2-})=1$. Therefore, the mutual information between two random variables '+' and '−' can be given by:

$$I(+;-) = \sum_{\substack{'+' \in \{c_1+, c_2+\} \\ '-' \in \{c_1-, c_2-\}}} p(+,-) \log\left(\frac{p(+,-)}{p(+)p(-)}\right) \quad (1)$$

$I(+;-)$ can be interpreted as 'co-occurrence' character: given one data sample from a particular '+' cluster, it can be identified how much is known about which '−' cluster it belongs to. A higher co-occurrence can indicate a stronger overlapping of the cluster areas, and can thus be preferred.

In an example, given K different binary partitions on (+/−) samples respectively, $K^2$ pairs of associations can be evaluated according to Equation 1. Then, the top K associations can be selected (e.g., K=20 can be selected for experimentation purposes). For each of top ranked associations, the cluster centers can be $C_{+1}, C_{-1}, C_{+2}$ and $C_{-2}$. LDA can be used to find a 1D projection vector, $v_{proj}$, that best separates a pair of positive and negative cluster centers from another pair (see, e.g., FIG. 5C). A partition of the score space can thus be defined by the projection vector $v_{proj}$ and a 1D threshold.

Figure 5B:
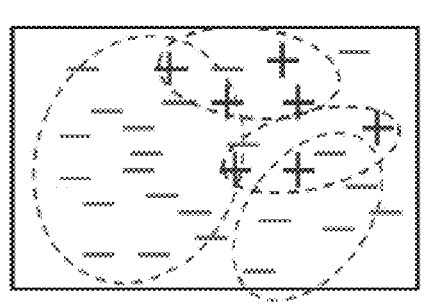
Figure 5C:
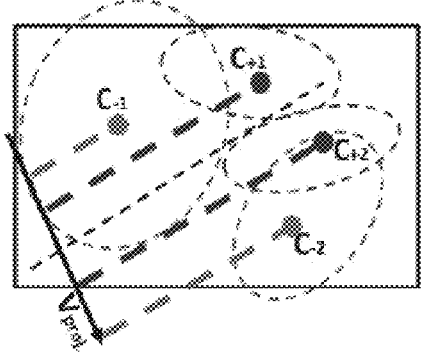
Figure 5D:
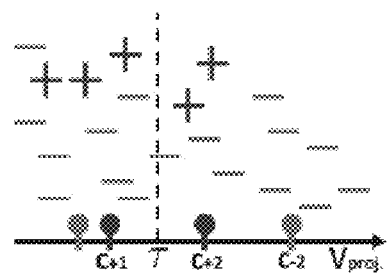

To avoid the partition becoming ill-posed again, such as in the example of FIG. 5A, $v_{proj}$ can be fixed and, during a model optimization stage, a threshold $\tau$ can be optimized within the range of the middle of the two projected old cluster centers (see, e.g., FIG. 5D)). In summary, FIGS. 5A-5D illustrate generally an example of partitioning a score space in the presence of imbalanced class labels. In the example of FIG. 5A, K-means clustering can exacerbate an imbalance, such as can lead to over-fitting. In the example of FIG. 5B, both positive and negative samples can be partitioned separately. In the example of FIG. 5C, the partitioned positive and negative samples can be projected on a 1D axis. In the example of FIG. 5D, a threshold $\tau$ can be chosen, such as along the 1D axis, to partition the samples.

The general mixture of expert (MoE) model is formulated by $$P(Y|X) = \sum_E P(E|X)P(Y|X,E) \quad (2)$$

where $P(E|X)$ is the 'gate' function, indicating which model is responsible for generating each data. The output of the gate function directly depends on the input X, which differentiates between MoE methods and boosting-based models.

In score fusion, a score mapping $s(A) \alpha P(Y=1|X)$, can be provided that can adopt the probability representation for a maximum likelihood solution of the model parameter $\theta = (\omega^{(L)}, \omega^{(R)}, \tau) \times$ $$L \sim \prod_X P(Y|X, \theta) \quad (3)$$
$$= \prod_X \left[ \sum_{i=L,R} G^{(i)}(X, \tau) P(Y|E^{(i)}(X, \omega^{(i)})) \right]$$

where, the gate of left child as an example can be given by $$G^{(L)}(X, \tau) = \begin{cases} 1 & \text{if } X \cdot w \leq \tau \\ 0 & \text{otherwise} \end{cases} \quad (4)$$

In an example, the decision in Equation (4) can be made more easily by introducing a transition region (see, e.g., FIG. 4), so that the fusion output will be smooth across a boundary.

Linear models can be used for local experts, such as with a likelihood function $$P(Y|E^{(i)}(X, w^{(i)})) = \exp\{-\|X \cdot w^{(i)} - Y\|^2\} \quad (5)$$

The maximum likelihood model solution of Equation (3) cannot be solved directly because of the summation term within the multiplication loop. Therefore, an 'expectation' of the gate response and 'maximization' of the likelihood at local experts can be iteratively updated. Because $G^{(i)}$ only involves a single parameter $\tau$, once the local experts are updated at each iteration, $\tau$ can be enumerated along 1D, and an optimal value according to Equation (3) can be obtained.

Local experts can be trained according to the following example. In the example, Let $X = (x_1, \ldots, x_M, 1_n)$ be an N-by-M+1 likelihood matrix with entry $X(n, m)$, the score output on clip n from base classifier m, and $1_n$ a n-by-1 vector appended for adjusting the global offset. $Y \in \{0, 1\}^n$ is the binary vector of training labels, and $\Lambda$ a diagonal matrix with $\Lambda(n, n) = G(x_{(n)})$, indicating the gate response on the score vector of video clip n. $\Lambda(n, n) = 1/0$ (or something in the middle), indicates the video clip n is within/outside the local region (or in the transition region).

A maximum likelihood solution for $\omega$ of Equation 5 is in the same form of the minimum mean squared error (MMSE) representation:

$$w^* = \arg\min(X^* w - Y)^T \Lambda (X^* w - Y) \quad (6)$$

The regularized MMSE solution is given by $\omega = (X^T \Lambda X + \lambda I)^{-1} \Lambda Y$. Instead of $\lambda$-regularization, a non-negative constraint can be applied on all weights $\omega_i \geq 0$, $I=1, \ldots, M$. The weight $\omega_{M+1}$, corresponding to the offset term, may be negative. In an example, when applied to a bank of base classifiers which perform no worse than random chance, this constraint can enforce the intuition that no such classifier should be discredited by the fusion model. With this constraint, the system can have equivalent (or even better) generalization compared to regularization, while still behaving as a convex optimization problem which can be solved efficiently using existing toolboxes. When base classifiers have random performance for a particular event, the non-negative constraint can produce a sparse solution (i.e., $\exists$ i s.t. $\omega_i = 0$). Because the scores are not necessarily normalized across the base classifiers, the model can include $1_n$ in the likelihood matrix X, and can learn an extra weight $\omega_{M+1}$. In an example, without constraining $\|\omega\|$ to be a unit vector, a local fusion expert can simultaneously adjust an offset and scale variance of each source. Exemplary pseudo-code for training and testing of an Expert Forest model is given in Table 1.

TABLE 1

| Pseudo-code of training (top) and testing (bottom) our model. |
|---|
| 1. Generate K random binary partitions on both the positive and negative samples |
| 2. Take K positive and K negative partitions to form $K^2$ pairs of associations |
| 3. Extract projection vectors from top K association pairs based on Eqn.2 |
| 4. For: each projection vector $v_k$ |
| 5.     Learn kth MoE model according to Eqns. 4,5,6. |
| ================================================== |
| 1. For: each MoE model k |
| 2.     estimate fused score $s_k$ according to Eqns. 3,5,6. |
| 3. Compute the final score s = avg$\{s_k | k = 1,\ldots,K\}$ |

Experiments were performed with the TRECVID Multimedia Event Detection (MED) dataset, including detecting 15 complicated events from around 34 k video clips comprising more than 1000 hours. The experiments were performed with M=5 base classifiers, each of which estimates event probability based on a different multimedia feature. For example, C1.(visual) Motion information is captured by a bag of words feature on 3D histograms of oriented gradients, which is classified by an SVM with Histogram Intersection Kernel (HIK).

C2.(visual) The relationship between events and objects is captured using the Object Bank feature, computed using the reference code, and the maximum response of each detector across the clip's frames is classified with an SVM using HIK.

C3.(audio) Low-level audio information is captured using Mel-Frequency Cepstral Coefficients (MFCCs), computed using the HTK Speech Recognition Toolkit5, and an SVM with HIK is trained using a bag of words quantization of the MFCC features.

C4.(audio) Higher-level audio information is captured by Acoustic Segment Models (ASM), which is classified using an SVM with HIK.

C5.(visual) The relationship between events and their environments is captured using the Gist feature, which is computed on a random 20 frame subset of the video, and the 20 outputs of a per-frame linear SVM are averaged to give the C5 base classifier score.

Four experiments were conducted using the fusion method on different video events and different base classifiers on the TRECVID2011 dataset. The experiments included (a) detecting five events (E1-E5) from the fusion of four base-classifiers (all except C4); (b) detecting ten events (E6-E10) from the fusion of all five base-classifiers; (c) a stress test to evaluate the fusion system's robustness by adjusting the quality of the base-classifiers (E7); and (d) a stress test on imbalanced label distribution. In training the score fusion for E1-E15, the model learned on an average of 140 positive instances and 2000 negative instances per event category. For E1-E5, the model was tested on 4292 video clips with an average 2.3% of positive instances; for E6-E15, the model was tested on 32037 video clips with an average 0.37% of positive instances. The experimental expert forest model uses K=20 pairs of local experts. Bootstrapping (with replacement) is performed on the training data 20 times, each time using the same number of labeled samples, and the area under the DET curve (AUC) score is evaluated each time, where lower numbers indicate better performance.

In an example, the results of the score fusion model can be compared to several other methods using the same base classifier likelihoods. These other methods include score averaging, nonlinear-SVM, RBF network, MMSE- and MFoM-based linear fusion, and a naive MoE fusion without partitioning. The nonlinear-SVM and RBF network are trained using LibSVM using a Gaussian kernel, and cross-validation was performed to optimize both the kernel width and the different weighting for positive and negative instances (e.g., to handle label imbalance). The MoE model uses 4 local experts initialized using K-means and optimized using EM. As described above, AUC is used to evaluate the fusion methods across a range of operating points, and a random system will have AUC=0.5. This is performed instead of measuring performance at a particular operating point on the curve, which may be evaluated as the proportion of inconsistent score pairs, e.g. a negative clip ranked higher than a positive clip. Such a discrete metric is equal to the normalized Wilcoxon-Mann-Whitney ranking statistic and also similar to the average precision.

The average AUC over the 20 runs on the 15 event categories is provided in Tables 2 and 3.

TABLE 2

Fusion performance (AUC) on event 1-5, with 4 base classifiers. For each event, the best AUC is shown in bold.

| Event | Best Base | Avg. | SVM | RBF | MoE | MMSE | MFoM | Ours |
|---|---|---|---|---|---|---|---|---|
| Attempting a board trick | .078 | .075 | .103 | .078 | .060 | .062 | .071 | .055 |
| Feeding an animal | .199 | .191 | .209 | .212 | .172 | .172 | .175 | .167 |
| Landing a fish | .065 | .084 | .112 | .109 | .082 | .061 | .067 | .055 |
| Wedding ceremony | .046 | .042 | .065 | .043 | .055 | .030 | .046 | .035 |
| Woodworking | .124 | .096 | .135 | .089 | .079 | .083 | .089 | .075 |

TABLE 3

Fusion performance (AUC) on events 6-15, with 5 base classifiers. For each event, the best AUC is shown in bold.

| Event | Best Base | Avg. | SVM | RBF | MoE | MMSE | MFoM | Ours |
|---|---|---|---|---|---|---|---|---|
| Birthday party | .115 | .082 | .138 | .089 | .071 | .062 | .061 | .056 |
| Changing a vehicle tire | .144 | .130 | .106 | .110 | .112 | .089 | .113 | .087 |
| Flash mob gathering | .043 | .038 | .076 | .037 | .028 | .033 | .031 | .024 |
| Getting a vehicle unstuck | .105 | .073 | .115 | .088 | .060 | .058 | .057 | .050 |
| Grooming an animal | .193 | .209 | .175 | .159 | .150 | .153 | .156 | .148 |
| Making a sandwich | .123 | .135 | .128 | .107 | .106 | .113 | .101 | .101 |
| Parade | .072 | .063 | .127 | .072 | .056 | .055 | .051 | .047 |
| Parkour | .070 | .092 | .135 | .099 | .062 | .067 | .065 | .058 |
| Repairing an appliance | .087 | .066 | .112 | .057 | .039 | .074 | .040 | .035 |
| Working on a sewing project | .152 | .190 | .186 | .174 | .142 | .156 | .137 | .133 |

Accordingly, the score fusion approach gives on average the best performance.

In an example, a local expert forest model for score fusion can be configured to exploit changes in the relative performance of a bank of base classifiers by partitioning the score space and learning local weight sets, such as can be used to optimally combine scores in the resulting regions. The method has been demonstrated on the TRECVID MED task, fusing scores produced by 5 different base classifiers in order to detect 15 complex events from an archive of more than 1000 hours of video. The model shows a significant performance advantage over other fusion methods, in terms of average AUC over 300 trial runs.

In an example, fusion weights can be determined based on a relative performance of a base classifiers over regions of the score space, such as without taking into consideration properties of individual clips. In addition to the output probability, the performance of the base classifiers can correlate with video metadata. As an example, the performance of the base classifier using HOG3d features can have poorer performance on highly-compressed videos, as compared to those with relatively less compression. In order to capture such performance dependencies in the fusion model, clip-level metadata can be used in weighting, such as to reduce a weight given to the HOG3d classifier probability for highly-compressed video. This can be achieved, for example, by expanding the score space to include dimensions representing relevant metadata measures and applying the above-described partitioning method.

In an example, a solution space can be divided into multiple local regions. At each region, a local expert can be provided to classify data in the corresponding local area. In an example, a local expert can include a linear weighting of a binary (or other) classifier. Different classifiers can be differently weighted, such as corresponding to different regions. In an example, an output of the local expert can include a score, such as a probability or likelihood that a particular data item fits within a particular classification. Multiple scores can be fused together to provide a final determination of the probability or likelihood that the particular data item fits within a particular classification.

In an example, a random forest algorithm can be applied to improve classification accuracy. Stochastic or random methods can be used to divide a solution space into multiple local regions. In an example, a solution space can be randomly divided multiple different times, such as to obtain different divisions of the same solution space. In this manner, the solution space is re-sampled one or more times. In an example where the solution space includes training data, the training data can be partitioned and sampled multiple times, such as to form a random forest of decision trees.

"Stacking" is a widely used ensemble method that can first train multiple base-level classifiers and then learn a meta-level classifier with an additional set of training data. The training data for the base-level and meta-level classifiers can also be referred to as held-in and held-out data, respectively. Generally, each base-classifier generates a continuous (likelihood/confidence) score, which the meta-classifier then fuses to generate a final ranking. Fundamental to stacking methods is a need to divide the training data wisely, since labels used for base-level training cannot be used for meta-training without reducing performance. This is especially problematic when training data is limited, since subsets of the data may not sufficiently illustrate the underlying semantic concept.

Figure 6A:
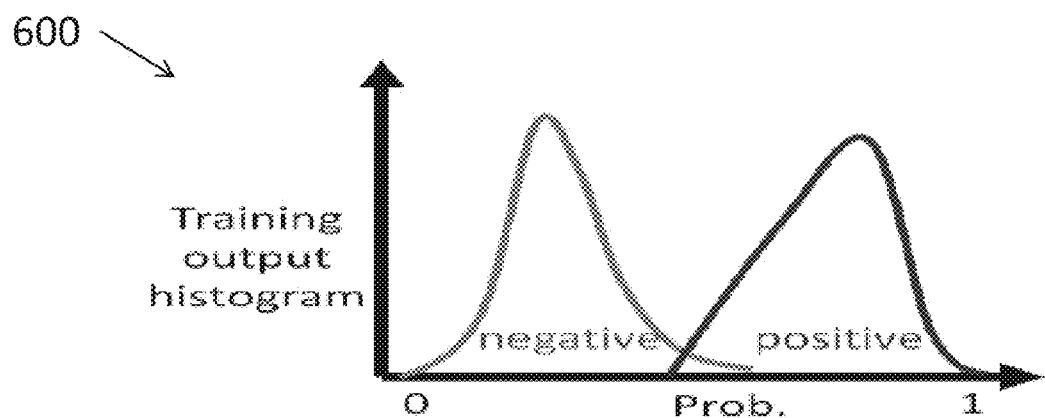
FIG. 6A illustrates generally an example of a score distribution on training data.
Figure 6B:
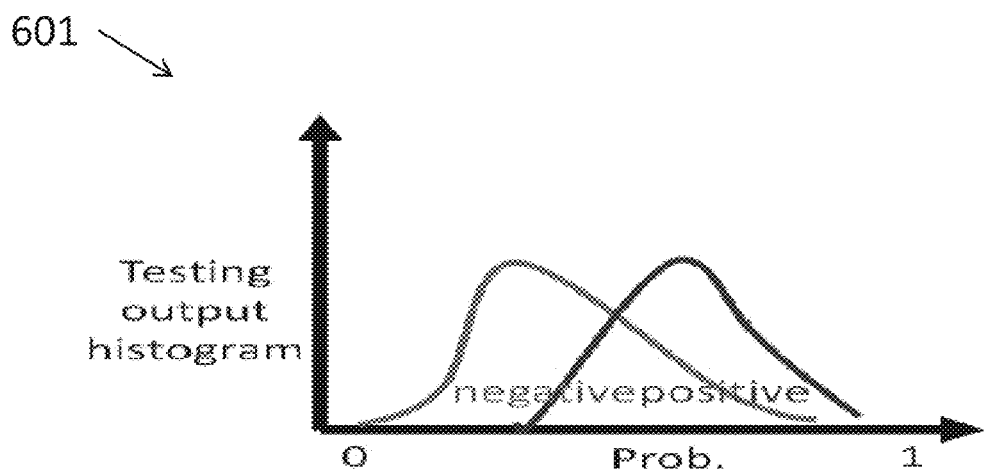
FIG. 6B illustrates generally an example of a score distribution on test data.

Base and meta training data can be separated because scores on training data exhibit over-fitting, and thus do not accurately reflect the performance of the classifier on unseen test data. For example, FIGS. 6A and 6B illustrate generally exemplary score distributions 600 and 601. In the example of FIGS. 6A and 6B, a base-classifier's output likelihood score provides better separation of positive and negative labels on the training data (FIG. 6A) than on unseen testing data (FIG. 6B). A better training performance can indicate over-fitting and, consequently, poor generalization. Using training scores to learn a meta classifier can reduce performance, such as due to this difference in score distribution.

A more nuanced consideration of scores from training clips can provide information that can be used to improve a fusion model. For example, a correlation among classifiers can be inferred in spite of over-fitting. While cross-validation can provide similar benefits in some cases, generating balanced partitions of the training data is complicated when the numbers of positive examples are very low. Base-level data can be reused for meta-training, a scenario which can be especially appealing in cases when an amount of labeled data is limited. This approach can permit use of more data for training better base-classifiers, such as with less concern about under-training of the meta classifier.

Figure 7:
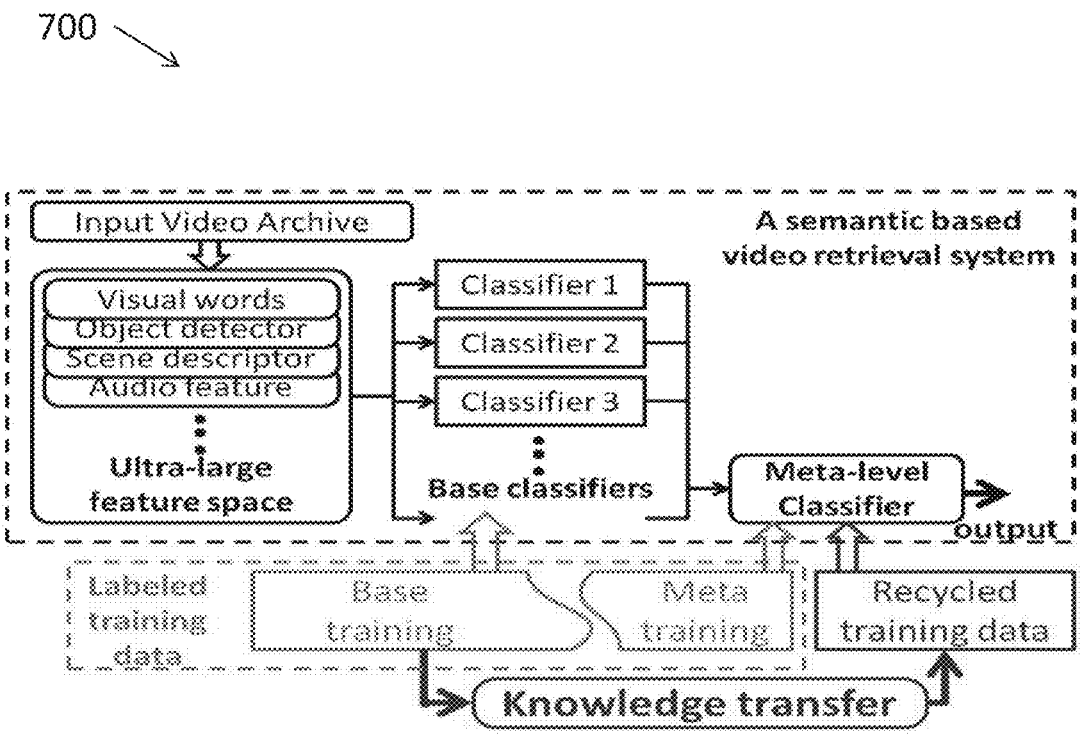
FIG. 7 illustrates generally an example of a semantic-based video retrieval system with base-training data recycling.

FIG. 7 illustrates generally an example of a sematic-based video retrieval system with base-training data recycling. In the example of FIG. 7, training data can be split for base-training and metatraining, and base-training data can be 'recycled' for metatraining.

The idea of re-using the base-training data can be interpreted as a knowledge-transfer process, such as where scores output by the base-classifiers (a vector $X_S$ of probabilities) on training clips, together with the binary event label $y_S$, constitutes the source domain $D_S=\{X_S, y_S\}$. The base classifier output scores $X_T$ on unseen (meta-training) data with corresponding labels $y_T$ define the target domain $D_T=\{X_T, y_T\}$. The score distributions can be different, e.g., $P(X_S) \neq P(X_T)$, yet $D_S$ contains valuable information to guide the meta-classification problem defined in $D_T$: $func(X_T) \rightarrow y_T$. Among transfer learning approaches, a good fit can be transfer-adaboost (TrAdaBoost), which is a generalization of AdaBoost that can leverage source domain data with a different distribution given limited sampling of the target domain.

In an example, the base-training-data recycling framework can use the meta-level training data $D_T=\{X_T, y_T\}$ and transfer the knowledge from base-level training data $D_S=\{X_S, y_S\}$. For example, let $X_S=(x^{(1)}{}_S, \ldots, x^{(M)}{}_S)$, and $X_T=(x^{(1)}{}_T, \ldots, x^{(M)}{}_T)$, where M is the number of base classifiers. First, a histogram equalization can be used to rebalance the training score distribution according to the testing score distribution on each base classifier, such as in FIG. 6A, such that the source domain after marginal equalization $\hat{D}_S=\{\hat{X}_S, y_S\}$ has the same marginal score-distribution on each base classifier: $P(\hat{x}_s^{(m)})=P(x_t^{(m)})$, for $m=1, \ldots, M$. In an example, the positive and negative data can be adjusted separately.

After histogram equalization, the joint score distribution of $\hat{X}_S$ and $X_T$ can be different despite an identical marginal distribution. In this case, the TrAdaBoost algorithm can be used to learn a meta-level fusion classifier given both $\hat{D}_S$ and $D_T$.

For example, an M-by-1 score vector $x_i$ can be extracted from each data sample $i \in \{1, \ldots, N_S\}$, such as indexing the balanced source domain (base-training) data from $\hat{D}_S$, and $i=in\{n_S+1, \ldots, n_S+n_T\}$ indexing the target domain data (e.g., unseen meta-training data). An exemplary algorithm is provided in Algorithm 1.

---

Alorithm 1 TrAdaBoost for training data recycling

Input: $x_i \in \mathbb{R}^M$, $y_i \in \{0, 1\}$, $i = 1, \ldots, n_S + n_T$
Initialize: cost vector $c_i = 1$, $i = 1, \ldots n_S + n_T$
For $t = 1, \ldots, T$
  1. normalize the cost vector $c_i = c_i/(\Sigma_i c_i)$
  2. fusion learner $f^{(t)}(x_i) \rightarrow [0, 1]$
  3. fusion residue $\epsilon_i = |f^{(t)}(x_i) - y_i|$ 4. target domain errer $\epsilon = \dfrac{\sum_{i=n_S+1}^{n_S+n_T} c_i \epsilon_i}{\sum_{i=n_S+1}^{n_S+n_T} c_i}$ 5. set $\beta_t = \epsilon/(1 - \epsilon)$, $\beta = 1/(1 + \sqrt{2 \ln n_S/T})$
  6. update the cost
    $c_i \rightarrow c_i \cdot \beta^{\epsilon_i}$, $\quad i = 1, \ldots, n_S$
    $c_i \rightarrow c_i \cdot \beta_t^{-\epsilon_i}$, $\quad i = n_S + 1, \ldots, n_S + n_T$
Output: $f^{(t)}$ and $\alpha_t = -\log \beta_t$, for $t = 1, \ldots, T$
Testing stage: fused score $s(x_i) = \Sigma_{t=1}^T f^{(t)}(x_i) \alpha_t$

---

With respect to training data recycling, a crucial feature of TrAdaBoost is that the cost $c_i$ for data $i$ in the target domain $D_T$ increases when the fusion residue is big so that the following iterations will focus on more difficult data. On the other hand, $c_i$ for data i in the source domain $\hat{D}_S$ can decrease if the residue is big, such as indicating data i in $\hat{D}_S$ does not fit into $D_T$.

In an example of a fusion learner, let the overall data and their fusion residue be organized in $x=[(x_1, \ldots, x_{n_s+n_T})^T, 1]$ and $e=(e_1, \ldots, e_{n_s+n_T})^T$, respectively, where $\overline{1}$ is a $(n_s+n_T)$-by-1 auxiliary one dimensional vector. With the costs organized in a diagonal matrix $\Lambda(i, i)=c_i$, linear, regularized least-square fusion can be applied, and a weighted MMSE solution can be solved for, such as a solution that minimizes mean-squared fusion residue:

$$W^* = \underset{w}{\mathrm{argmin}}\{e^T \cdot \Lambda \cdot e + \lambda \|w\|^2\}, \qquad (7)$$

where $\lambda$ controls regularization (e.g., use $\lambda=0.01$), and $e=x \cdot w - y$. The MMSE solution can thus be given by $$W^* = (x^T \Lambda x + \lambda I)^{-1} x^T \Lambda y. \qquad (8)$$

Also note that in the testing stage, fusion classifiers can be combined from all iterations, such as can be different from traditional binary-classification-based TriAdaBoost.

Several experiments were carried out on video event detection of 5 challenging video categories from the TRECVID2011 dataset: attempting a board trick; feeding an animal; landing a fish; wedding ceremony; and woodworking. Stacked learning was performed with M=4 base classifiers, each of which estimates event probability based on a different multimedia feature. For example, (1) motion is captured by a bag of words feature on 3D) histograms of oriented gradients, and classified by an SVM with Histogram Intersection Kernel (HIK); (2) the relationship between events and objects is captured using the Object Bank feature, computed using the reference code, and the maximum response of each detector across the clip's frames is classified with an SVM using HIK; (3) the relationship between events and their environments is captured using the Gist feature, which is computed on a random 20 frame subset of the video, and the 20 outputs of a per-frame linear SVM are averaged to give a base classifier score; and (4) low-level audio information is captured using Mel-Frequency Cepstral Coefficients (MFCCs), computed using the HTK Speech Recognition Toolkit2, and an SVM with HIK is trained using a bag of words quantization of the MFCC features.

In these experiments, the training dataset contained 2062 videos, with around 100 positive labels per event category. About 80% of the data was used for training the 4 base classifiers (fixed), and subsets of the remaining 20% were used for learning the meta-level classifier. The testing dataset contained 4292 videos with on average 101 positive labels per event category. Both the training and testing sets were imbalanced, with negative labels heavily outnumbering positive labels. The overall performance of the ranking system is evaluated using average precision (AP), defined as $$AP = \frac{1}{N_p} \sum_{i \in \{y^+\}} Pr(i) \qquad (9)$$

where $N_p$ is the number of positive labels, and $Pr(i)$ is the precision statistics based on top-ranked data with a cutoff at the ith positive data. The AP statistics is equivalent to the Area-Under-ROC-Curve (AUC) statistic or normalized Wilcoxon-Mann-Whitney (WMW) ranking statistics. In an example, the performance of the system can be evaluated on its best operating point based on F1 statistics, defined as $$F1 = 2 \cdot \frac{\mathrm{precision} \cdot \mathrm{recall}}{\mathrm{precision} + \mathrm{recall}}. \qquad (10)$$

A ratio r between the number of meta-training (held out) and base-training (held in) clips can be provided. Base-training data can be bootstrapped (e.g., sampling with replacement) as $D_S$, and a subset of the output score can be sampled from meta-training data as $D_T$, thereby varying the ratio r from about ¼ down to about 1/20. This scenario can be repeated (e.g., 100 times), and the average AP and F1 performance can be determined for all 5 events. In an example, a regularized leastsquare fusion classifier can be used (e.g., Equation (8)), which has shown to yield to better performances at meta-level than nonlinear SVM.

In an example, a multi-level classifier system can include multiple base-level classifiers and at least one meta-level fusion classifier. An output of the base-classifiers can be used as an input to the at least one meta-classifier. Training data can be separated for base-level training and meta-level training, because, in some cases, base-level classifiers can be "over-fit," that is, a base classifier having very good performance in a training mode may not necessarily perform well on new or novel test data. In this case, an output of a base classifier on training data might be misleading if it were used to train the meta-level classifier directly. In some cases, labeled or classified training data can be very valuable or scarce. If labeled or classified training data were partitioned into two parts (one for the base-level and one for the meta-level classifier) for training, both of the base- and meta-level classifiers could suffer since they would be trained only on half of the data.

Accordingly, training-data recycling can be used. This can include using most of the labeled or classified data to train base classifiers, and reserving only a relatively small portion of the data for training meta-level classifiers. Meanwhile, with the help of the meta-level training data (precluded from the base-level training), the base-level training data can be recycled and re-used at the meta-level.

In an example, a base-training score can be derived from a base classifier output from base-training data. A meta-training score can be derived from a base classifier output from new, or test data. A distribution of the base-training score can be adjusted according to the meta-training score. Then, a knowledge-transfer framework, such as transfer-adaptive boost (triAdaboost), can be employed to re-use the information from the base-training score at the meta level. The knowledge-transfer framework works by iteratively adjust the weighting of base training data, such as by decreasing an importance of the base-training data that are more suspicious to be over-fitting, or by keeping or increasing an importance of more valuable base-training data, such as data that provides more consistent performance compared to meta-training data.

In summary, a stacked learning framework can be employed to re-use base-level training data for meta-level learning. The problem can be addressed as a knowledge transfer, and can include first applying a histogram to re-balancing to the marginal distribution of source-domain features (e.g., base-classifier score output on held-in data) according to target-domain features (e.g., score output on held-out data). From there, an adaptation of the TriAdaBoost algorithm can be used, such as with a weighted least-square fusion learner, such as for training the meta-level score fusion.

Figure 8:
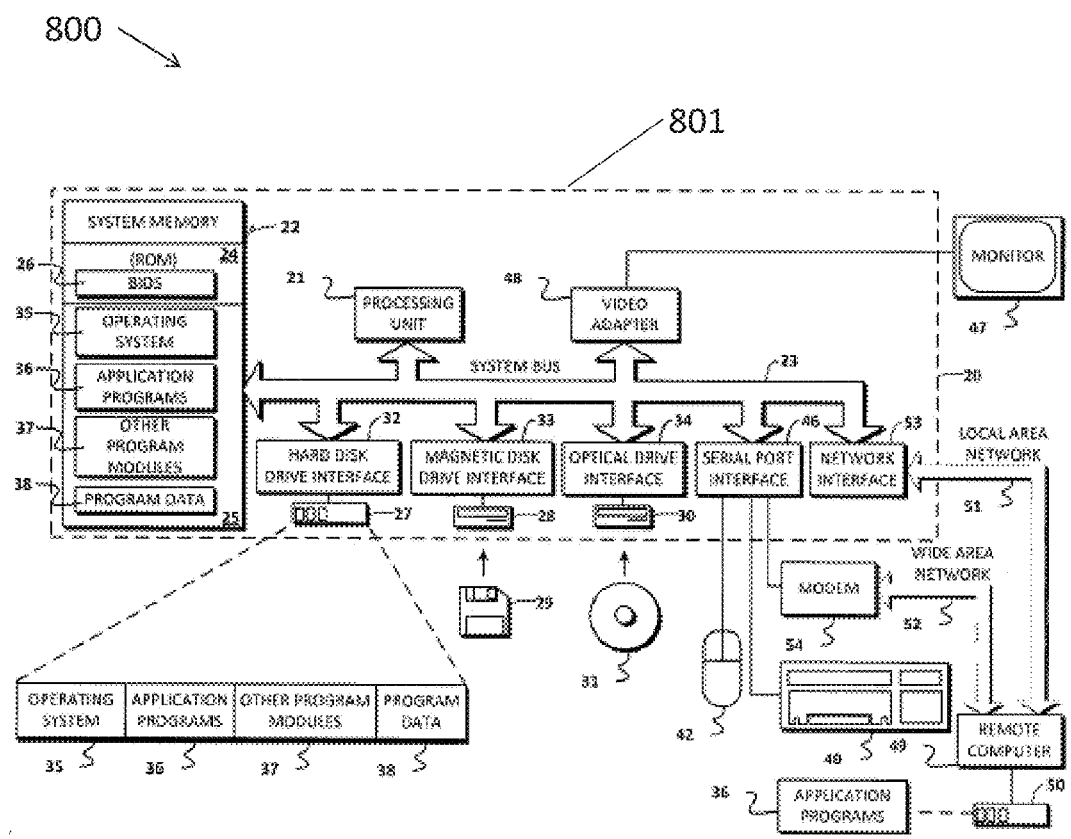
FIG. 8 illustrates generally a block diagram of a computer system, such as can be configured to implement various classifier methods.

FIG. 8 is a block diagram of a computer system, such as can be configured to implement various classifier methods. In the embodiment shown in FIG. 8, a hardware and operating environment is provided that may be specifically programmed to implement the methods and system described herein.

As shown in FIG. 8, one embodiment of the hardware and operating environment includes a general purpose computing device in the form of a computer 801 (e.g., a personal computer, workstation, or server), including one or more processing units 21 (e.g., processor circuits), a system memory 22, and a system bus 23 that operatively couples various system components including the system memory 22 to the processing unit 21. There may be only one or there may be more than one processing unit 21, such that the processor of computer 801 comprises a single central-processing unit (CPU), or a plurality of processing units, commonly referred to as a multiprocessor or parallel-processor environment. In various embodiments, computer 801 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 801, such as during start-up, may be stored in ROM 24. The computer 801 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 801. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or method described herein may be resident on any one or number of these computer-readable media. A user may enter commands and information into computer 801 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 801 may operate in a networked environment using logical connections to one or more remote computers or servers, such as remote computer 49. These logical connections are achieved by a communication device coupled to or a part of the computer 801; the invention is not limited to a particular type of communications device. The remote computer 49 can be another computer, a server, a router, a network PC, a client, a peer device or other common network node, and typically includes many or all of the elements described above I/O relative to the computer 801, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 801 is connected to the LAN 51 through a network interface or adapter 53, which is one type of communications device. In some embodiments, when used in a WAN-networking environment, the computer 801 typically includes a modem 54 (another type of communications device) or any other type of communications device, e.g., a wireless transceiver, for establishing communications over the wide-area network 52, such as the internet.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

VARIOUS NOTES & EXAMPLES

Example 1 can include or use subject matter (such as an apparatus, a method, a means for performing acts, or a device readable medium including instructions that, when performed by the device, can cause the device to perform acts), such as can include or use a system, comprising a processor circuit, including a first data input configured to receive probability estimates from two or more separate feature classifiers over a collection of training items, those items having associated ground truth category information. Example 1 can include a processor-readable medium, including instructions that, when performed by the processor, configure the system to select a fusion model to adapt local statistics of the two or more separate feature classifiers over the collection of training items, and fuse the probability estimates from the separate feature classifiers according to the selected fusion model to generate an output probability estimate for new items that do not have associated ground truth information.

Example 2 can include, or can optionally be combined with the subject matter of Example 1, to optionally include the processor-readable medium, wherein the processor-readable medium includes instructions that, when performed by the processor, configure the system to fuse the probability estimates from the separate feature classifiers using weights assigned to each classifier.

Example 3 can include, or can optionally be combined with the subject matter of Example 2, to optionally include the processor-readable medium, wherein the processor-readable medium includes instructions that, when performed by the processor, configure the system to use an objective function to fuse the probability estimates from the separate feature classifiers, the objective function comprising a minimum mean squared error fusion function with a non-negative constraint.

Example 4 can include, or can optionally be combined with the subject matter of Example 2, to optionally include the processor-readable medium, wherein the processor-readable medium includes instructions that, when performed by the processor, configure the system to use an objective function to fuse the probability estimates from the separate feature classifiers, the objective function comprising a linear support vector machine with a non-negative constraint.

Example 5 can include, or can optionally be combined with the subject matter of one or any combination of Examples 1 through 4 to optionally include the first data input configured to receive probability estimates from the two or more separate feature classifiers over a collection of training items, wherein the collection of training items comprises video clips or still images that can be categorized by an activity depicted in the video clips or still images.

Example 6 can include, or can optionally be combined with the subject matter of one or any combination of Examples 1 through 5 to optionally include the processor-readable medium, wherein the processor-readable medium includes instructions that, when performed by the processor, configure the system to compare the generated output probability estimate to a threshold to identify a category for new items that do not have associated ground truth information.

Example 7 can include or use subject matter (such as an apparatus, a method, a means for performing acts, or a device readable medium including instructions that, when performed by the device, can cause the device to perform acts), such as can include or use a method, comprising receiving probability estimates from two or more separate feature classifiers over a collection of training items, those items having associated ground truth category information, selecting a fusion model to adapt to the local statistics of the separate feature classifiers over the training data, and fusing the probability estimates from the separate feature classifiers according to the model to generate an output probability estimate for new items without associated ground truth information.

Example 8 can include, or can optionally be combined with the subject matter of Example 7, to optionally include the fusion model, wherein the fusion model comprises weights assigned to each classifier.

Example 9 can include, or can optionally be combined with the subject matter of Example 8, to optionally include an objective function for fusing the local statistics that comprises a minimum mean squared error fusion with non-negative constraint.

Example 10 can include, or can optionally be combined with the subject matter of Example 8, to optionally include an objective function for fusing the local statistics that comprises a linear support vector machine with non-negative constraint.

Example 11 can include, or can optionally be combined with the subject matter of one or any combination of Examples 7 through 10 to optionally include the items, wherein the items are video clips and the categories denote activities depicted by the video clip.

Example 12 can include, or can optionally be combined with the subject matter of one or any combination of Examples 7 through 11 to optionally include fusing the probability estimates to generate an output probability estimate, including using the output probability estimate to identify a category for new items that do not have associated ground truth information.

Example 13 can include or use subject matter (such as an apparatus, a method, a means for performing acts, or a device readable medium including instructions that, when performed by the device, can cause the device to perform acts), such as can include or use a computer-readable storage device having instructions for causing a computer to implement a method, the method comprising receiving training data that includes items with associated ground truth information, using a first portion of the training data to generate at least two base-level classifiers, and using a second portion of the labeled training data to generate a meta-level classifier, wherein the first and second portions of the training data at least partially overlap.

Example 14 can include, or can optionally be combined with the subject matter of Example 13, to optionally include the method, further comprising identifying a base training score distribution using the base-level classifiers, identifying a meta training score distribution using the base-level classifiers, adjusting the base training score distribution using information about the meta training score distribution, and generating a meta-level classifier using the adjusted base training score distribution and the meta training score distribution.

Example 15 can include, or can optionally be combined with the subject matter of Example 14, to optionally include the method, wherein the identifying the base training score distribution using the base-level classifiers includes identifying the base training score distribution by evaluating the base-level classifiers on items in the first portion of the training data, and wherein the identifying the meta training score distribution using the base-level classifiers includes identifying the meta training score distribution by evaluating the base-level classifiers on items in a non-overlapping portion of the second portion of the training data.

Example 16 can include, or can optionally be combined with the subject matter of Example 15, to optionally include the method, wherein adjusting the base training score distribution includes iteratively adjusting a weighting of the base training score distribution.

Example 17 can include, or can optionally be combined with the subject matter of one or any combination of Examples 13 through 16 to optionally include the method, wherein adjusting the base training score distribution includes using histogram equalization to adjust the base training score distribution using the meta training score distribution.

Example 18 can include, or can optionally be combined with the subject matter of Example 17, to optionally include the method, wherein generating the meta-level classifier includes fusing an output of the at least two base-level classifiers.

Example 19 can include, or can optionally be combined with the subject matter of one or any combination of Examples 13 through 18 to optionally include the method, wherein receiving training data that includes items with associated ground truth information includes receiving video clip data and/or image data with associated ground truth information.

Example 20 can include, or can optionally be combined with the subject matter of Example 19, to optionally include the method, wherein using the first portion of the training data to generate the at least two base-level classifiers includes using the data to generate a classifier configured to distinguish an activity depicted in the video clip data and/or image data.

Example 21 can include or use subject matter (such as an apparatus, a method, a means for performing acts, or a device readable medium including instructions that, when performed by the device, can cause the device to perform acts), such as can include or use a method comprising receiving scores from two or more separate feature classifiers over a collection of training items, those items having associated ground truth category information, partitioning a score space, applying linear fusion to local clusters of the training items in the partitioned score space, and iteratively optimizing the partition and fused local clusters.

Example 22 can include or use subject matter (such as an apparatus, a method, a means for performing acts, or a device readable medium including instructions that, when performed by the device, can cause the device to perform acts), such as can include or use a method comprising generating an expert forest comprising at least two different partitioned expert pairs, wherein each of the expert pairs includes a linear binary partition that is configured to divide items into local clusters, testing items without associated ground truth information by evaluating the expert forest, receiving base classifier scores, using the received base classifier scores to identify relevant local experts, and fusing the base classifier scores into a scalar output using the identified relevant local experts.

Example 23 can include, or can optionally be combined with the subject matter of Example 22, to optionally include fusing the base classifier scores into a scalar output, including uniquely weighting each of the base classifier scores. Example 23 can include, or can optionally be combined with the subject matter of one or any combination of Examples 21 or 22 to optionally include uniquely weighting each of the base classifier scores, including applying a non-negative constraint on all weights.

Example 24 can include, or can optionally be combined with the subject matter of one or any combination of Examples 22 or 23 to optionally include receiving the base classifier scores corresponding to each of the at least two different partitioned expert pairs, including identifying a maximum likelihood that a test item corresponds to a particular local cluster.

Example 25 can include, or can optionally be combined with the subject matter of one or any combination of Examples 22 through 24 to optionally include identifying the expert forest, in a learning mode, by applying k-means clustering to samples corresponding to each of the local clusters to generate a pair of clusters for each tree in the forest, using the clustered samples to identify a location of the linear binary partition.

Example 26 can include, or can optionally be combined with the subject matter of Example 25, to optionally include using the clustered samples to identify a location of the linear binary partition, including determining a one-dimensional projection vector that separates a pair of clusters corresponding to one of the unique classifications, and identifying a threshold along the projection vector.

Example 27 can include, or can optionally be combined with the subject matter of one or any combination of Examples 22 through 26 to optionally include testing items without associated ground truth information, including testing video clips or images without associated ground truth information.

Each of these non-limiting examples can stand on its own, or can be combined in various permutations or combinations with one or more of the other examples.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system, comprising:
 a processor circuit, including:
  a first data input configured to receive probability estimates from two or more separate feature classifiers over a collection of training items, those items having associated ground truth category information; and
  a processor-readable medium, including instructions that, when performed by the processor, configure the system to:
   select a fusion model to adapt local statistics of the two or more separate feature classifiers over the collection of training items;

generate K partitions on each separate feature classifier to form $K^2$ pairs of associations;

determine a maximum likelihood estimate of a pair of the $K^2$ pairs being the correct classifier including modelling the likelihood using a localized expert forest and using a linear model for the localized expert forest; and fuse the maximum likelihood estimates from the separate feature classifiers according to the selected fusion model to generate an output probability estimate for new items that do not have associated ground truth information.

2. The system of claim 1, wherein the processor-readable medium includes instructions that, when performed by the processor, configure the system to fuse the probability estimates from the separate feature classifiers using weights assigned to each classifier.

3. The system of claim 2, wherein the processor-readable medium includes instructions that, when performed by the processor, configure the system to use an objective function to fuse the probability estimates from the separate feature classifiers, the objective function comprising a minimum mean squared error fusion function with a non-negative constraint.

4. The system of claim 2, wherein the processor-readable medium includes instructions that, when performed by the processor, configure the system to use an objective function to fuse the probability estimates from the separate feature classifiers, the objective function comprising a linear support vector machine with a non-negative constraint.

5. The system of claim 1, wherein the first data input is configured to receive probability estimates from the two or more separate feature classifiers over a collection of training items, wherein the collection of training items comprises video clips or still images that can be categorized by an activity depicted in the video clips or still images.

6. The system of claim 1, wherein the processor-readable medium includes instructions that, when performed by the processor, configure the system to compare the generated output probability estimate to a threshold to identify a category for new items that do not have associated ground truth information.

7. The system of claim 1, further comprising instructions that, when performed by the processor, configure the system to select K associations of the $K^2$ associations with the highest determined maximum likelihood scores.

8. The system of claim 7, further comprising instructions that, when performed by the processor, configure the system to determine a cluster center for each of the K selected associations.

9. The system of claim 8, further comprising instructions that, when performed by the processor, configure the system to perform linear discriminant analysis to determine a one dimensional projection vector that separates pairs of cluster centers.

10. The system of claim 9, wherein instructions for determining a one dimensional projection vector that separates a pair of cluster centers, include instructions that, when performed by the processor, configure the system to project the determined cluster centers onto a one dimensional axis corresponding to the one dimensional projection vector.

11. The system of claim 10, wherein instructions for determining a one dimensional projection vector that separates a pair of cluster centers include instructions that, when performed by the processor, configure the system to partition the one dimensional axis into partitions based on a specified threshold.

12. A method, comprising:
receiving probability estimates from two or more separate feature classifiers over a collection of training items, those items having associated ground truth category information;

selecting a fusion model to adapt to the local statistics of the separate feature classifiers over the training data;

generating K partitions on each separate feature classifier to form $K^2$ pairs of associations;

determining a maximum likelihood estimate of a pair of the $K^2$ pairs being the correct classifier including modelling the likelihood using a localized expert forest and using a linear model for the localized expert forest; and fusing the maximum likelihood estimates from the separate feature classifiers according to the model to generate an output probability estimate for new items without associated ground truth information.

13. The method of claim 12 wherein the fusion model comprises weights assigned to each classifier.

14. The method of claim 13 wherein an objective function for fusing the local statistics comprises a minimum mean squared error fusion with non-negative constraint.

15. The method of claim 13 wherein an objective function for fusing the local statistics comprises a linear support vector machine with non-negative constraint.

16. The method of claim 12, wherein the items are video clips and the categories denote activities depicted by the video clip.

17. The method of claim 12, wherein fusing the probability estimates to generate an output probability estimate includes using the output probability estimate to identify a category for new items that do not have associated ground truth information.

* * * * *